Feb. 14, 1956
S. WILSON, JR
2,734,789
MOLDING FOR TABLE AND COUNTER TOPS
Filed June 3, 1954
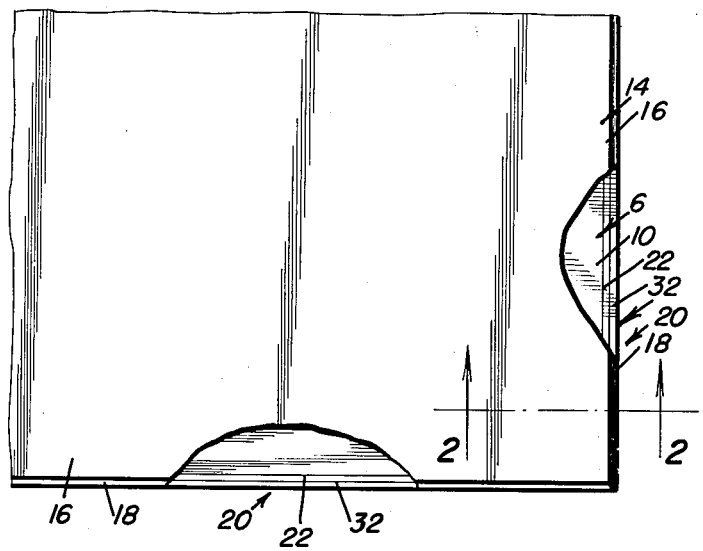
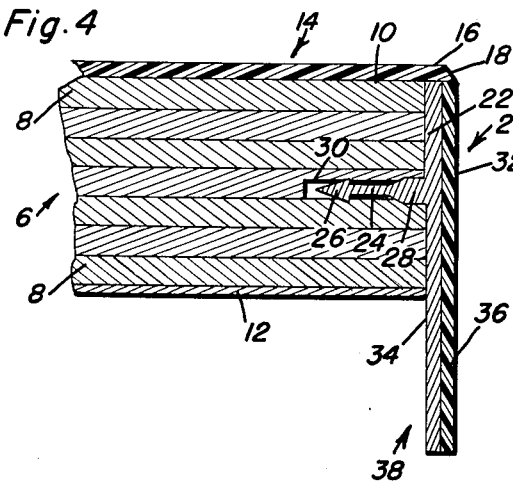
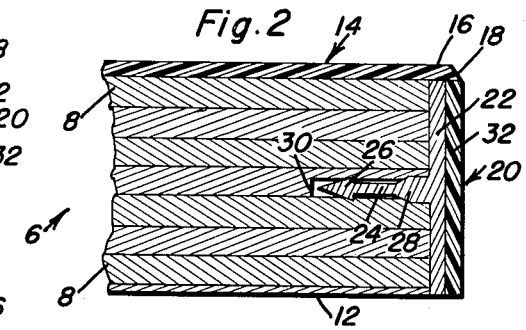
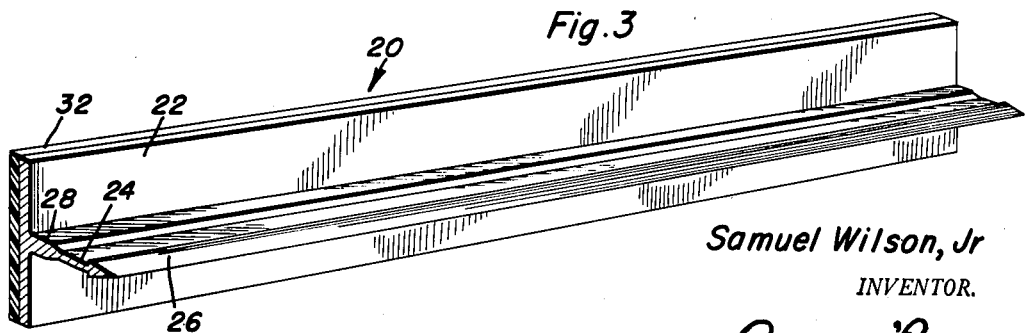
Samuel Wilson, Jr
INVENTOR.

United States Patent Office 2,734,789
Patented Feb. 14, 1956

2,734,789

MOLDING FOR TABLE AND COUNTER TOPS

Samuel Wilson, Jr., Tacoma, Wash.

Application June 3, 1954, Serial No. 434,130

1 Claim. (Cl. 311—107)

The present invention relates to certain new and useful improvements in table and counter top constructions, broadly speaking, and has more particular reference to the means which is expressly applied and utilized to aptly and effectually cover the top and marginal surfaces of the so-called table top, this in a manner to affect an acceptable appearance and finish not found, it is believed, in analogous prior art constructions.

A further aspect of the invention has to do with composite moldings applicable to table, counter tops and the like to achieve what is commonly known in the trade and art as "self-edging" this being done in a manner so that no part of the self-edging molding, except the exterior facing, is exposed to view.

More specifically, and somewhat briefly summarized the invention, therefore, has to do with a table top embodying a body portion, surfacing material covering the top surface of said body portion and having marginal edge portions projecting beyond and overhanging the cooperating vertical marginal edges of said body portion, and self-edging molding attached to and covering said marginal edges, the thickness of said molding being equal to said overhanging edge portions with the perimeter of the latter precisely flush with the outer surface of the molding.

Construed from another point of view, the invention also appertains to an improved and resultful combination characterized by a table or counter top embodying a body portion having a level top surface and flat marginal surfaces, ornamentally faced molding superimposed upon, covering, and fastened to said marginal surfaces, the upper edge of said molding being flush with said top surfaces, and topping and surfacing material completely covering said top surfaces and having marginal edge portions projecting, overlying and resting atop the upper edges of said molding and terminating flush with the exterior surfaces of said molding and providing a finished corner.

This invention also relates to a composite molding as applied to table and counter tops and the like so as to achieve what is known in the art as "self-edging," whereby no metal is exposed to view.

One object of the invention is to provide a means of "self-edging" which eliminates the tedious clamping, gluing and shoring or the expensive and cumbersome hot strips usually necessary to attach a "self-edging."

A further object of the invention is to provide a self-edging for table tops and counter tops and the like adapted to act as a finish for the edges of such tops usually matching the material on the top and forming an edging which is durable, extremely neat in appearance, inexpensive to manufacture, and very easy to apply.

A still further object of the invention is to provide a self-edging material which may be wide enough to extend below the table or counter top and be durable enough in itself so as not to require blocking or bracing behind it.

A still further object of the invention is to provide a means of quickly and accurately attaching a self-edging to table and counter tops without exposed fastenings.

Other objects, features and advantages will become more readily apparent from the following description and the accompanying sheet of illustrative drawings.

In the drawings, wherein like numerals are employed to designate like parts throughout the views:

Figure 1 is a fragmentary top plan view of a table or counter top or the like constructed in accordance with the principles of the present invention with portions of the surface covering broken away to expose the complemental structural parts.

Figure 2 is an enlarged fragmentary sectional view taken approximately on the plane of line 2—2 of Figure 1 looking in the direction of the arrows.

Figure 3 is a perspective view of the composite molding by itself.

Figure 4 is a fragmentary sectional view based on Figure 2 and showing the self-edging molding with its lower half-portion depending below the bottom of the body portion and defining what may be described as either a skirt or an apron.

Referring now to the drawings with reference numerals and accompanying lead lines, the part of the over-all combination, herein conveniently called the table or counter top, is denoted generally by the numeral 6. This may be of any appropriate construction but is usually a laminated structure wherein the lamination 8 defines a normally horizontal base whose top side or surface is flat and denoted at 10 and whose underneath or bottom surface is denoted at 12. In carrying out the principles of the invention the top side or surface 10 is completely covered with top surfacing material, this being a lamination of appropriate material and denoted by the numeral 14. It might be stated in this connection that all marginal edges are the same in construction and the description of one edge portion will suffice for all and with reference to Figure 2 it will be seen that the marginal edge portion of the covering lamination or material 14 projects beyond and overhangs the marginal edge portion of the body portion 6 as at 16. The extreme perimeter edge is bevelled or chamfered as at 18. The complemental composite self-edging molding is herein denoted generally by the numeral 20 and as shown in Figure 2 and also in Figure 3 this has two principal parts one of which is called the foundation unit. This is preferably of metal but may be of commercial plastics or other material. While it may be described as substantially T-shaped in cross-section, it is generally referred to as comprising an elongate flat-faced plate 22 of appropriate cross-section and width. This is provided on its inward side with integral keying and anchoring flange which is denoted by the numeral 24. The flange is preferably located between the upper and lower edges in the form of the invention seen in Figure 2. The leading, lengthwise edge of the flange is provided with an enlarged bead which may be described as wedge-shaped in cross-section and which is denoted at 26. That portion of the flange which joins the cooperating side of plate 22 is also increased in thickness or cross-section and defines a secondary wedge 28. This wedge-equipped flange is forced into a groove or keyway 30 which is rabbeted or otherwise cut into the marginal edge of the body portion 6 and when once jammed in place it serves to frictionally anchor the plate 22 and at the same time to conceal the mode of attaching the same to the body portion. The exterior or viewable side or surface of the plate is coated or covered with a lamination 32 of appropriate material which usually corresponds in character and color and otherwise with the lamination 14. It will be noted that the over-all thickness of the molding corresponds to the width or dimension of the overhang 16. Moreover, the overhang overlies the upper edge of plate 22 and facing 32 so that the several parts combine in defining a well finished and neatly appearing corner construction. The molding may be of a width to correspond with the thickness of the body portion or, if preferred, it may be constructed as shown in Figure 2 wherein lower portions 34 and 36 drop or descend below the bottom 12 to define what may be conveniently referred to either as a skirt or an apron 38. The foundational unit comprising the backing or plate 22 and flange means may be extruded from aluminum and as stated the facing ply or lamination 32 may be from moldable decorative commercial plastic, an appropriate grade bonded in place on the backing or plate.

This edging may also be applied to table and counter tops that do not already have the surfacing material applied. In that case it is not necessary to undercut the edge. The horizontal groove is then formed in such a position that the top edge of molding will be flush with the top of the plywood or other surface then the surfacing material is applied over the top and over molding, then trimmed even with the face of molding. It will be clear too that the molding may be manufactured in various required widths and, as revealed in the drawings, and generally does, project or extend to a plane below the lower surface of the laminated body portion and thus functions as an apron or skirt.

Since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In combination, a table or counter top embodying a normally horizontal base having a flat top surface and a flat right angularly disposed marginal surface, said base having a groove opening outwardly through said marginal surface and defining a horizontal lengthwise keyway, surfacing material bonded to and covering said top surface and having a marginal edge portion projecting beyond and overhanging said marginal surface, and self-edging molding abutting and covering said marginal surface, said molding being composite in construction and embodying a backing and a decorative outer facing therefor, said backing having a keying flange on its inward side fitting into said keyway and said flange having a wedge-shaped bead on its leading end frictionally wedged and thus anchored and retained in said keyway, the thickness of said molding being equal to said overhanging edge portion and the perimeter of the latter being flush with the outer facing of said molding, said facing completely covering the complemental surface of said backing and no portion of the latter being exposed to view.

References Cited in the file of this patent
UNITED STATES PATENTS

| | | |
|---|---|---|
| 1,273,207 | Wege | July 23, 1918 |
| 1,768,731 | Awbrey | July 1, 1930 |
| 2,030,730 | Wilson | Feb. 11, 1936 |
| 2,272,058 | Dieter et al. | Feb. 3, 1942 |
| 2,509,037 | Flicker | May 23, 1950 |
| 2,549,414 | Bonnell | Apr. 17, 1951 |
| 2,612,423 | Hennell | Sept. 30, 1952 |